June 28, 1938. J. W. HUME 2,122,065
WHEEL BALANCING UNIT
Filed Oct. 16, 1935

Inventor
James W. Hume
By Beaman & Langford
Attorney

Patented June 28, 1938

2,122,065

UNITED STATES PATENT OFFICE 2,122,065

WHEEL BALANCING UNIT

James W. Hume, Jackson, Mich.

Application October 16, 1935, Serial No. 45,172

2 Claims. (Cl. 301—5)

The present invention relates to balance weights for attachment on the tire retaining flange of a vehicle wheel to balance the unbalanced force which would otherwise result in objectionable vibration of the wheel on rotation.

This invention comprises an embodiment of the balancing weight disclosed in my copending application Ser. No. 645,504, filed December 3, 1932, and is particularly adapted to be used on wheel rims of the type generally used for oversized low pressure tires although of course it may be applied to any rim.

In balancing units of the type wherein the weight is secured by a spring clip which resiliently holds the weight against the under side of the rim flange great difficulty is encountered in removing the balancing unit after it has been secured in balancing position.

An object of this invention therefore is to provide a balancing unit for attachment to a tire rim flange by means of a spring clip wherein the unit is provided with means for receiving a tool to facilitate the removal of the unit from and assembling the unit on the rim flange.

Another object is to provide the means as set forth above in the form of a hole for receiving a pin by which the unit may be rotated from the rim flange.

A further object of the invention is to provide a balancing weight of the type described having a novel construction for receiving and centering the securing clip.

Figure 1:
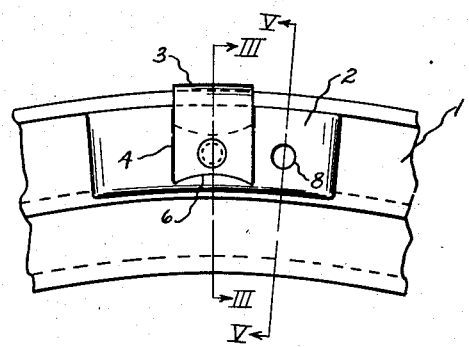
Figure 3:
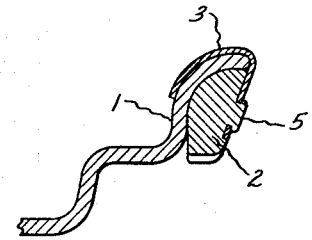
Figure 2:
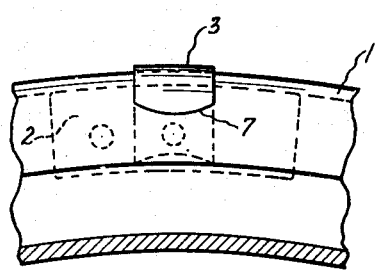
Figure 4:
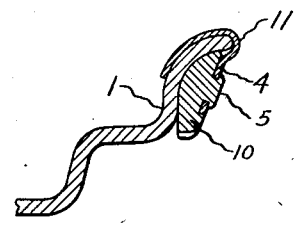
Figure 7:
Figure 5:
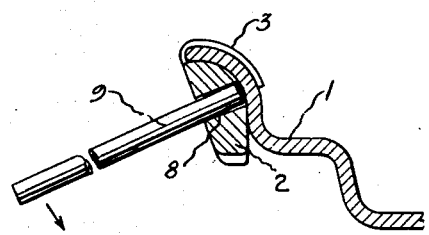
Figure 6:
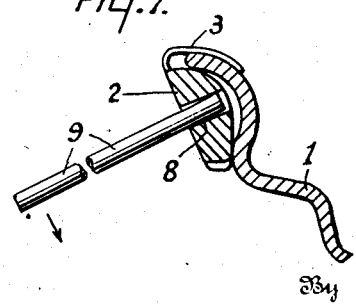

These and other objects will be apparent from the following specification when taken with the accompanying drawing in which, Fig. 1 is a partial elevation of the outside of a rim flange showing the balancing unit secured in position, Fig. 2 is a partial elevation of the inside of the rim flange of Fig. 1 showing the resilient weight securing clip in place, Fig. 3 is a section on the line III—III of Fig. 1, Fig. 4 is a section corresponding to that of Fig. 3 showing a different spring clip for use with a more flat weight, Fig. 5 is a section on the line V—V of Fig. 1 having added the pin used for removing the balancing unit from the rim flange, Fig. 6 is a view of the spring clip as originally blanked from a strip, before bending, and Fig. 7 is a view corresponding to Fig. 5 disclosing the balancing unit partially removed from the rim.

Referring particularly to the drawing, the reference character 1 indicates a tire rim flange having a balancing unit comprising a cast weight 2 clamped to the under side of the flange by a spring clip 3. The weight portion 2 of the balancing unit is shaped to snugly fit on the under side of the rim flange having not only the curve of the outward flare of the underside of the flange 1 but also the curve of its periphery. Likewise, the spring clip 3 has the curve of the inside of the flange 1 and at the portion it bears against the edge of the rim flange 1 has the same peripheral curve. There is thus provided between the weight 2 and the spring clip 3 a clearance having substantially the same curvature as the flare of the rim flange 1. It is to be understood, however, that when the balancing unit is not secured to a rim flange, the spring clip 3 will be deflected somewhat toward the weight 2 so that when applied to the rim flange the necessary resilient clamping action will be obtained. This arrangement of the weight 2 and its securing spring clip has as a result the fact that the balancing unit can be removed only by a general rotary movement following the flaring curve of the rim flange. Accordingly, an accidental blow against the balancing unit in any direction except in a direction to cause rotary movement in a disassembling direction will be practically ineffective in removing the unit.

The weight 2 is provided with a recess 4 of substantially the same width as the spring clip 3 and of a depth equal to the thickness of the spring clip 3 for receiving the latter. In the preferred form of the invention the spring clip 3 is provided with a suitably punched hole and secured to the weight 2 by a rivet 5 integrally cast as a part of the weight 2, and extending through the hole. In order to more readily center the spring clip 3 in the recess 4 the lower side of the recess 4 is curved upwardly, the curved portion fitting in a concavity 6 on the lower edge of the spring clip 3. The opposite end of the spring clip 3 is provided with a convexity 7. The convexity 7 has the effect of placing the sharpened corners at the inside end of the clip nearer the edge of the rim flange and consequently lessening any marking action that might take place against the tire. For economy in manufacture the concavity 6 and the convexity 7 have the same curvature so that the spring clip blanks may be stamped end to end from a continuous strip.

Referring particularly to Figs. 1 and 5, a bore 8 is provided in the weight 2. The bore 8 is for the purpose of receiving a pin or rod 9 upon which downward force, as viewed in Fig. 5, will result in rotating the entire balancing unit off the rim flange 1. While, as shown, the bore 8 extends entirely through the weight 2 it is contemplated that if desired it may extend only partially through. Although the primary purposes of my bore and rod construction is to facilitate the removal of the balancing units from rim flanges it has been found that its use aids materially in the assembling of the balancing units on the flanges. While the construction above affords a most convenient means for removing or assembling the balancing units on rim flanges it is considered to be only a form of my broad invention which contemplates any construction against which a lever may act. For instance, a tool receiving protuberance or lug may be affixed to the weight 2. The rivet 5 might be hollow for receiving a pin such as 9. Furthermore, there might be a recess at each end of the weight against which a lever could act.

Fig. 4 discloses a modification of the invention wherein the weight 10 is more flat than the weight 2 in order that it may more closely follow the contour of the rim. With such a flattened weight 10 the securing spring clip 11 varies slightly from the shape of the spring clip 3 shown particularly in Fig. 3, in that it follows the contour of the rim flange 1 around the edge thereof.

In all forms of the invention the spring clip for securing the weight to the rim flange preferably is of sufficient length to extend inwardly a sufficient distance to be gripped between the side wall of the tire and the rim flange when the tire is inflated, whereby the weight is at least partially held in position by the tire.

It is preferred that the weights be of bronze, the spring clips of steel and the rod or pin of sufficiently heavy wire. However, other suitable materials may be used for any of the parts. The weight of the balancing units is determined by their length. It will be understood therefore that in weights of the relatively thin character disclosed in Fig. 4, the length will be greater for a given weight than those of relatively thick character disclosed in Fig. 3. The hole 8 may be at any desired location in the weight 2 and in the broadest form of the invention may comprise any tool receiving means on the unit.

Having thus described my invention what I claim and desire to secure by Letters Patent is:

1. A balance weight for balancing a pneumatic tired vehicle wheel, said weight being adapted to be removably secured on the flared peripheral edge of the tire retaining rim flange and comprising a thickened body portion, a resilient clip engaging said body portion for securing the same upon the outer side of said flange adjacent the edge thereof, said weight being of a configuration conforming to the general contour of the inner and outer sides of said flange adjacent the edge thereof, said body portion in position being disposed under the flare of said flange, said clip extending around said edge and generally conforming to the inner side of said flange and being sufficient to be gripped between the side wall of the tire and the inner side of the flange when the tire is inflated, the resiliency of said clip snugly clamping said body under the flared outer side of said flange and resisting removal of said weight, and a recess in said weight to receive a lever against which a force may be exerted generally radially inwardly of the wheel to rotate said clip over said flange to remove said clip from engagement therewith.

2. For balancing a wheel having a tire carrying rim with an outwardly flaring flange, a unit comprising clip means elastically engaging the flange, and a weight carried by said clip, said unit having a recess to receive a lever against which a force may be exerted to remove said clip by rotating the same over the surface of the rim.

JAMES W. HUME.